(12) United States Patent
Kim et al.

(10) Patent No.: US 11,740,539 B2
(45) Date of Patent: Aug. 29, 2023

(54) ACTUATOR FOR CAMERA AND CAMERA MODULE INCLUDING THE SAME

(71) Applicant: JAHWA electronics Co., Ltd., Cheongju-si (KR)

(72) Inventors: In Soo Kim, Bucheon-si (KR); Chang Wook Park, Siheung-si (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 0 days.

(21) Appl. No.: 17/870,278

(22) Filed: Jul. 21, 2022

(65) Prior Publication Data

US 2023/0194959 A1 Jun. 22, 2023

(30) Foreign Application Priority Data

Dec. 21, 2021 (KR) .......................... 1020210183304

(51) Int. Cl.
*G03B 13/36* (2021.01)
*G03B 5/00* (2021.01)
*G02B 7/08* (2021.01)

(52) U.S. Cl.
CPC .............. *G03B 13/36* (2013.01); *G03B 5/00* (2013.01); *G02B 7/08* (2013.01); *G03B 2205/0007* (2013.01)

(58) Field of Classification Search
CPC . G03B 5/00; G03B 5/04; G03B 13/36; G03B 3/10; G03B 3/12; G03B 2205/0007; G03B 2205/0015; G03B 2205/0053; G03B 2205/0069; G03B 3/02; G03B 13/34; G03B 30/00; G02B 7/021; G02B 7/04; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 41/0356
USPC ....... 359/911, 554, 555, 557, 811, 813, 814, 359/823, 824, 872, 877
See application file for complete search history.

(56) References Cited

U.S. PATENT DOCUMENTS

2016/0246069 A1\* 8/2016 Kim .......................... G02B 7/08
2017/0160558 A1\* 6/2017 Kim ......................... H02K 7/08
2020/0333686 A1 10/2020 Kim

FOREIGN PATENT DOCUMENTS

KR 10-2015-0020951 A 2/2015
KR 10-2019-0061439 A 6/2019
KR 10-2313876 B1 10/2021

\* cited by examiner

*Primary Examiner* — Marin Pichler
(74) *Attorney, Agent, or Firm* — NKL Law; Byungwoong Park

(57) ABSTRACT

An actuator for a camera includes a first carrier having a guiding rail formed to extend in an optical axis direction and provided at an outer side thereof, the first carrier moves in the optical axis direction; a second carrier moves in a direction perpendicular to an optical axis and accommodated at an inner side of the first carrier; a housing accommodates the first carrier; and a ball between the guiding rail and the housing, and a first interval between a first sector, which is an inner side of the first carrier where the guiding rail is provided, and an outer side of the second carrier is greater than a second interval between a second sector, which is a portion where the guiding rail is not provided in the inner side of the first carrier where the first sector is provided, and the outer side of the second carrier.

5 Claims, 6 Drawing Sheets

ACTUATOR FOR CAMERA AND CAMERA MODULE INCLUDING THE SAME

TECHNICAL FIELD

The present disclosure relates to an actuator for a camera, and a camera module including the same, and more particularly, to an actuator for a camera, which has improved driving performance by enhancing the physical facing structure between carriers, and a camera module including the same,

BACKGROUND

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens.

In addition, an optical image stabilization (OIS) function means a function of improving the sharpness of an image by adaptively moving the carrier having a lens in a direction to compensate for the shaking when the lens is shaken due to trembling.

Recently, a device or actuator in which integrates AF and OIS functions are integrated is being used. In this case, the configuration for moving an OIS carrier on which a lens is mounted in the X-axis direction and/or Y-axis direction perpendicular to the optical axis inside the AF carrier is integrally implemented together with the configuration for moving the AF carrier.

Meanwhile, in a device in which the AF function is implemented or in a device in which both AF and OIS functions are implemented, a structure in which balls arranged in the same direction as the optical axis are interposed between the AF carrier (mover) and the housing (stator) is applied in order to improve the behavior characteristics of the AF carrier moving in the optical axis direction.

This structure allows a proper separation distance between the mover and the stator to be continuously maintained, and by minimizing the frictional force through moving and rolling of the balls themselves and point-contact with the balls, the AF carrier may be moved more flexibly and accurately in the optical axis direction.

These balls are made of a material having high strength or hardness, like metal or ceramic, the mover or the like in contact with the balls is mainly made of a plastic material in order to increase the ease of molding.

If the ball and the object in contact with the ball are made of heterogeneous materials, when external shocks or vibrations occur due to the difference in hardness between the heterogeneous materials, the guiding part in contact with the ball may be easily damaged or worn.

In addition, since the ball is made in a spherical shape, the part in contact with the ball becomes a point where the force or pressure is maximized, so external impacts may further intensify damage or abrasion of the local part.

If the part where the ball is guided is damaged or worn, or if foreign substances such as particles detached from the plastic material are generated, tilt failure of the AF carrier, linearity disruption, or position control failure may occur, which may deteriorate the overall driving performance of the AF carrier.

Meanwhile, in the case of a device or actuator in which the OIS carrier is accommodated at the inner side of the AF carrier, the OIS carrier must move in a direction perpendicular to the optical axis, so a free space is formed between the outer side of the OIS carrier and the inner side of the AF carrier.

Therefore, if a drop, external impact or shaking occurs, the OIS carrier provided at the inner side of the AF carrier strikes the inner side of the AF carrier, and the force generated by the striking is transmitted to the outer side of the AF carrier where the ball is guided as it is. Due to this phenomenon, the part where the ball is guided may be damaged or worn.

However, in the prior art, only a few methods have been proposed to solve the problem caused by heterogeneous materials, and there is no recognition on the above problem that damage may occur due to collision between the outer side of the OIS carrier and the inner side of the AF carrier, so there is no way to solve the problem at all.

SUMMARY

The present disclosure is designed to solve the problems of the related art, and therefore the present disclosure is directed to providing an actuator or the like for a camera, which may further improve the driving precision for the linear movement of an AF carrier by more effectively suppressing the occurrence of wear or damage to a rail structure that guides balls.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

An actuator for a camera according to an embodiment of the present disclosure comprises: a first carrier having a guiding rail formed to extend in an optical axis direction and provided at an outer side thereof, the first carrier being configured to move in the optical axis direction; a second carrier configured to move in a direction perpendicular to an optical axis and accommodated at an inner side of the first carrier; a housing configured to accommodate the first carrier; and a ball disposed between the guiding rail and the housing, wherein a first interval that is an interval between a first sector, which is an inner side of the first carrier where the guiding rail is provided, and an outer side of the second carrier is greater than a second interval that is an interval between a second sector, which is a portion where the guiding rail is not provided in the inner side of the first carrier where the first sector is provided, and the outer side of the second carrier.

More preferably, the actuator for a camera according to the present disclosure may further comprise an avoidance space formed between the first sector and the second sector.

In this case, the avoidance space of the present disclosure may include a corresponding surface provided toward the first sector and having a shape corresponding to a surface of the guiding rail.

Moreover, the first and second sectors of the present disclosure may have a shape protruding toward the outer side of the second carrier, and the protruding size of the first sector may be smaller than the protruding size of the second sector.

According to an embodiment, an edge portion of the second carrier adjacent to the first sector may have an oblique or rounded shape.

According to a preferred embodiment of the present disclosure, by effectively suppressing or blocking the transmission of the impact force applied to the inner side of the AF carrier to the rail structure that guides the balls, it is possible to more effectively prevent damage, breakage, dents, or the like occurring at the rail structure that guides the balls.

According to the present disclosure, it is possible to precisely maintain the linear mobility and effectively suppress the tilt occurrence of the AF carrier, thereby improving the overall driving performance of the actuator.

In addition, according to another embodiment of the present disclosure, since a structure for collision suppression or the like may be implemented by applying a simple structure to the outer side of the OIS carrier and/or the inner side of the AF carrier, the actuator assembling and manufacturing process may be performed more efficiently, and the service life of the actuator may be further increased through durability enhancement.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
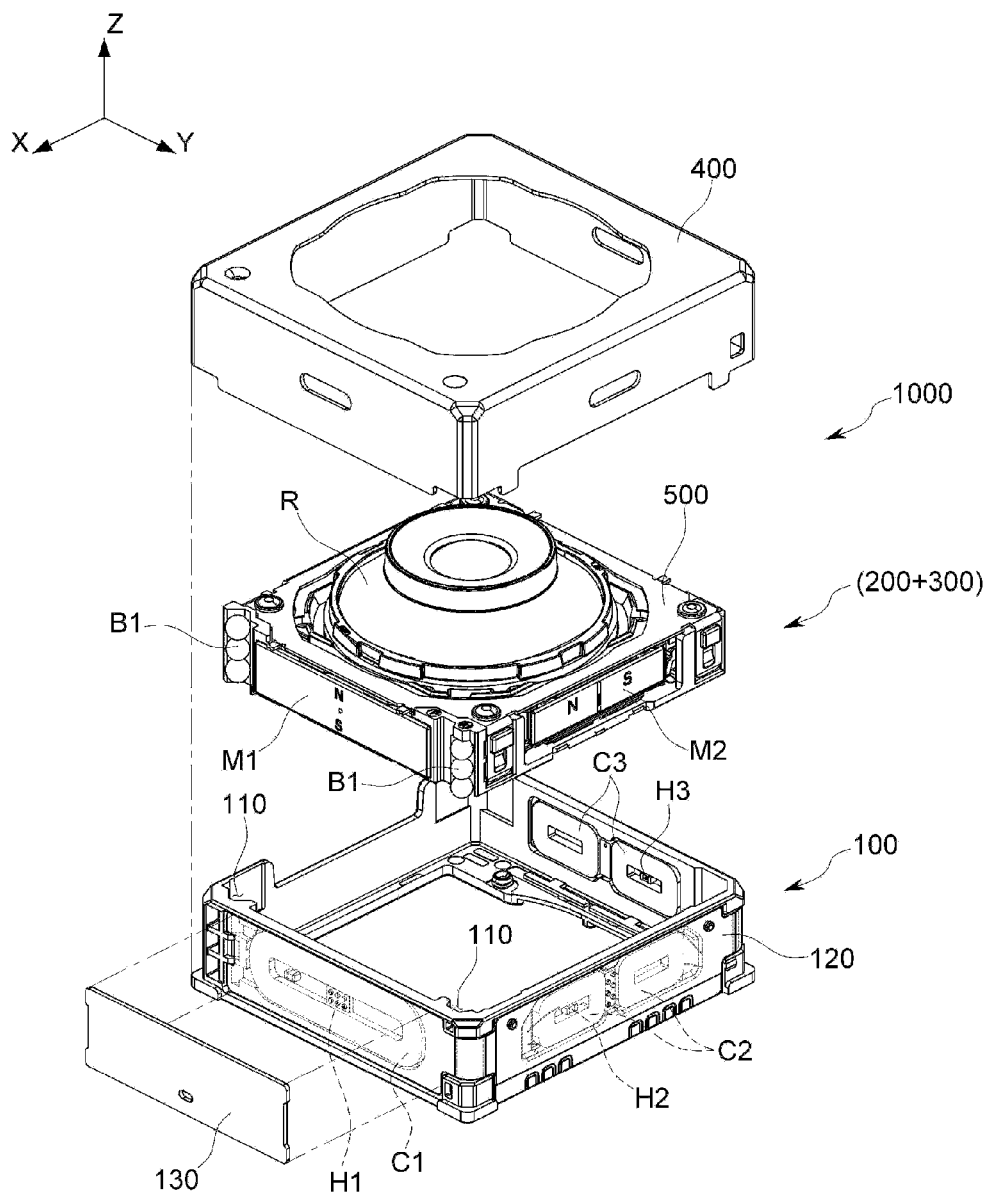
FIG. 1 is a diagram showing the overall configuration of an actuator for a camera according to a preferred embodiment of the present disclosure.

FIG. 1 is a diagram showing the overall configuration of an actuator 1000 for a camera (hereinafter, referred to as an 'actuator') according to a preferred embodiment of the present disclosure, The actuator 100 of the present disclosure may be implemented as a single device and may also be implemented as a camera module including a lens assembly R, an image sensor (not shown), and the like according to an embodiment.

As shown in FIG. 1, the actuator 1000 of the present disclosure may be configured to include a housing 100, a first carrier 200, a second carrier 300, a Z-stopper 500, and a case 400 serving as a shield can or the like.

As illustrated in FIG. 1, a lens R (lens assembly) is mounted on the second carrier 300 (OIS carrier) accommodated in the first carrier 200 (AF carrier) and physically moves together. Thus, if first carrier 200 moves forward and backward in the optical axis direction (Z-axis in FIG. 1 or the like), the lens R also moves in the optical axis direction.

If the lens R is moved along the optical axis direction due to the movement of the first carrier 200 in the optical axis direction, the distance between the lens R and an image sensor (not shown) such as a CCD or a CMOS is adjusted, thereby implementing the auto focus function and the zoom function.

Hereinafter, in the present disclosure, a direction axis corresponding to a path through which light is incident to the lens R, namely a direction axis corresponding to a direction perpendicular to the lens R, is defined as an optical axis (Z-axis), and two axes on a plane perpendicular to the optical axis (Z-axis)) are defined as X-axis and Y-axis.

The driving unit for moving the first carrier 200 in the optical axis direction based on the housing 100 may employ various components such as a shape memory alloy (SMA), a piezoelectric element and a micro electro mechanical system (MEMS), but it is preferable to implement a configuration that uses a magnetic force generated between a magnet and a coil in consideration of power consumption, noise suppression, space utilization, linear movement characteristic, efficiency in precision control, and the like.

Specifically, in a preferred embodiment of the present disclosure, a first magnet M1 is provided at one side of the first carrier 200 (AF carrier) as shown in FIG. 1, and a first coil C1 is provided to the housing 100 to face the first magnet M1.

Since electromagnetic force is a relationship of relative force, the first coil C1 may be provided to the first carrier 200 that is a mover, and the first magnet M1 may be provided to the housing 100 that is relatively a stator.

If a power of an appropriate magnitude and direction is applied to the first coil C1 through the control of an operating driver H1, a magnetic force is generated between the first coil C1 and the first magnet M1, and the first carrier 200 is moved linearly in the optical axis direction by using the generated magnetic force as a driving force in a relative viewpoint to the housing 100 or the like.

According to an embodiment, a detection sensor for detecting a position, a direction, or the like of the first carrier 200 may be further included. In this case, if the detection sensor detects the position of the first carrier 200 and transmits a signal corresponding thereto to the operating driver H1, the operating driver H1 controls the power of a corresponding magnitude and direction to be applied to the first coil C1.

The detection sensor may be implemented as a hall sensor H1 that detects the change in magnitude and direction of a magnetic field of a magnet existing in a detection area using a hall effect and outputs an electrical signal accordingly.

If the detection sensor is implemented as a hall sensor as above, the first hall sensor H1 is configured to detect the magnitude and/or direction of the magnetic field of the first magnet M1 provided to the first carrier 200 and output a signal corresponding thereto.

The sensing of the first hall sensor H1 and the control processing of the operating driver are preferably configured to be applied cyclically through feedback control so that the driving precision may be further improved through time-series continuous control.

The operating driver may be implemented as an independent electronic component or device. However, since the operating driver is generally implemented in the form of a single electronic component (chip) integrated with the hall sensor through SOC (System On Chip) or the like, in the drawings, the first hall sensor and the operating driver are denoted by the same reference sign H1.

A first ball B1 is disposed between the housing 100 and the first carrier 200. In order to realize effective guiding for linearity, the first ball B1 is provided at the outer side of the first carrier 200 and is preferably configured to be partially accommodated in at least one of a guiding rail 210 (see FIG. 2) provided at the outer side of the first carrier 200 and having a shape extending in the optical axis direction or a groove rail 110 formed at the housing 100.

If the first ball B1 is provided as above, the first carrier 200 may move more flexibly with a minimal frictional force by moving, rolling, point-contact, or the like of the first ball B1 while maintaining an appropriate interval with the housing 100 by means of the first ball B1, so it is possible to reduce noise, minimize the driving force, and further improve the driving precision.

According to an embodiment, the housing 100 of the present disclosure may include a yoke plate 130. The yoke plate 130 is configured to generate an attractive force with the first magnet M1. Since the first carrier 200 including the first ball B1 is pulled toward the housing 100 (X-axis direction in FIG. 1) due to the attractive force between the yoke plate 130 and the first magnet M1, the point-contact between the first ball B1 and the first carrier 200 and between the first ball B1 and the housing 100 may be continuously maintained.

The first coil C1, the first hall sensor H1, a the second coil C2 explained later, and a third coil C3 explained later are mounted to a circuit board 120 that electrically interfaces with an external module or power supply.

The actuator for a camera 1000 according to the present disclosure may include a Z-stopper 500 that limits movement of the second carrier 300 or the like in the Z-axis direction and guides movement in the first direction and/or the second direction according to an embodiment, so as to suppress deviations such as gapping or lifting of the second carrier 300 in the Z-axis direction when the OIS is driven.

Figure 2:
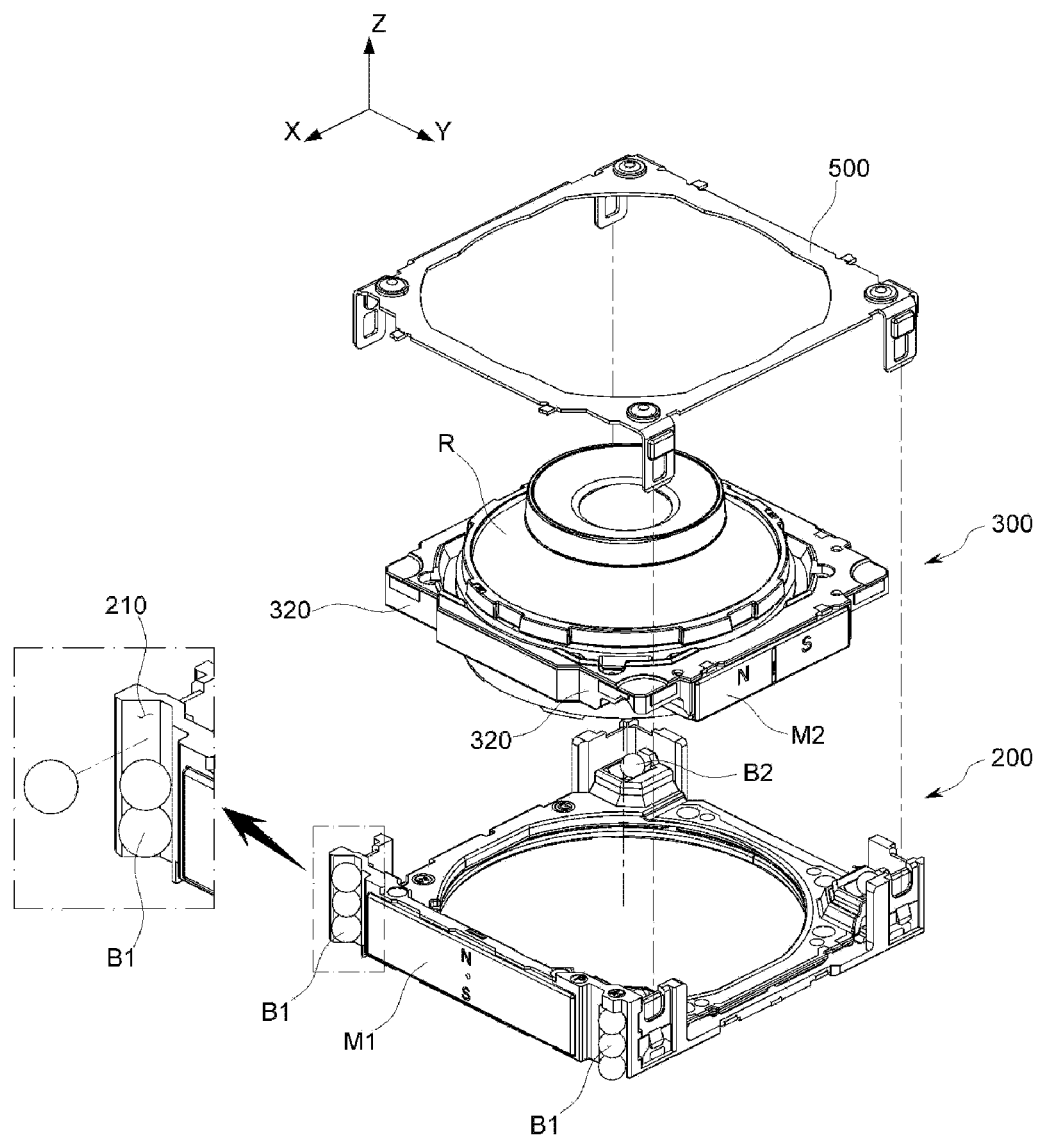
FIGS. 2 and 3 are diagrams showing the specific configurations of a first carrier and a second carrier according to a preferred embodiment of the present disclosure.
Figure 3:
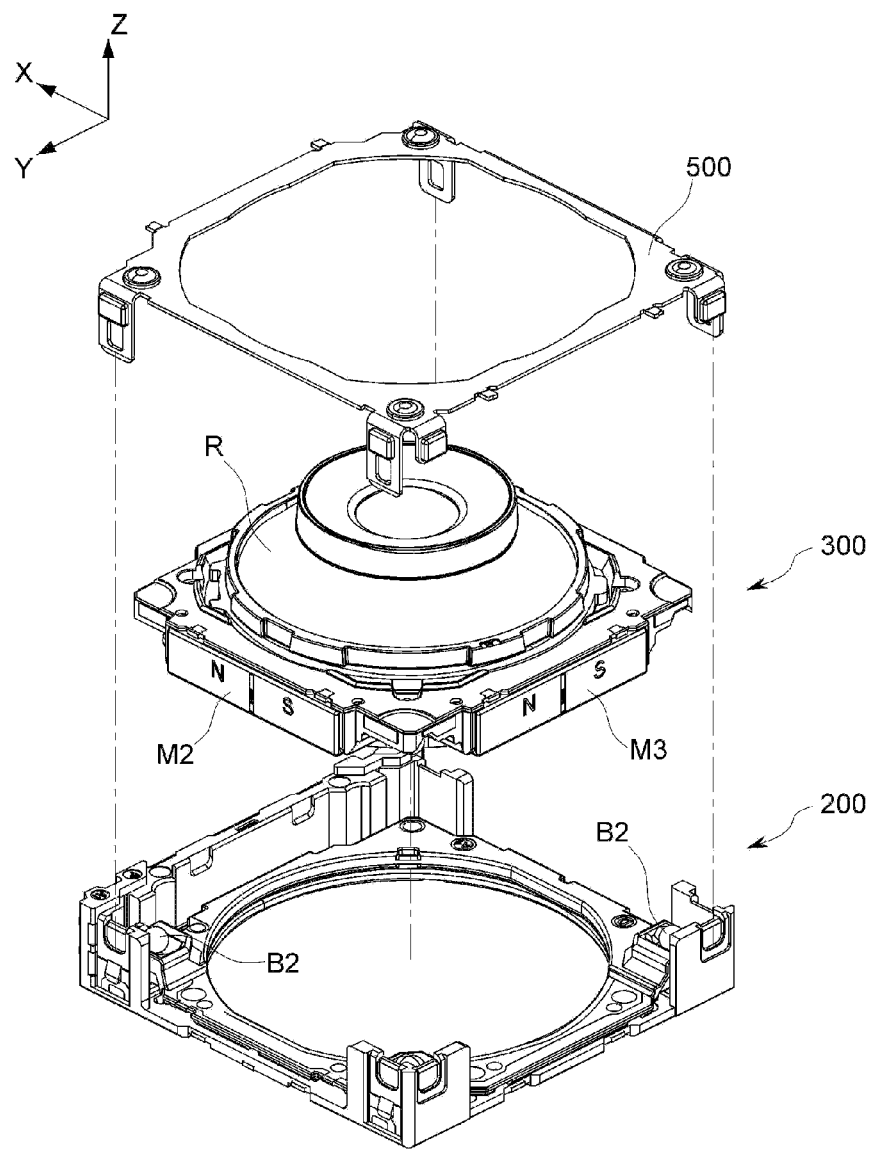

FIGS. 2 and 3 are diagrams showing the specific configurations of the first carrier 200 and the second carrier 300 according to a preferred embodiment of the present disclosure, and As shown in FIG. 2, the second carrier 300 (OIS carrier) moving in a direction (X-axis, Y-axis, or a combination thereof) perpendicular to the optical axis is configured to be accommodated at the inner side of the first carrier 200.

A second magnet M2 and a third magnet M3 are installed at the side surface of the second carrier 300 to realize movement in each direction (X-axis direction and Y-axis direction) perpendicular to the optical axis, and a second coil C2 and a third coil C3 respectively facing the second and third magnets M2, M3 are provided to the housing 100.

The second carrier 300 moves based on the first carrier 200. As illustrated in FIG. 2 and the like, the second carrier 300 may move through the second ball B2 disposed between the first carrier 200 and the second carrier 300, and according to an embodiment, the second carrier 300 may also move through an elastic member such as a wire or a spring.

As described above, the second carrier 300 may be moved in each direction by a driving force generated by the electromagnetic force between the second magnet M2 and the second coil C2 and between the third magnet M3 and the third coil C3.

Specifically, when shaking in the X-axis direction is detected by the second hall sensor H2 and a signal corresponding to the shaking is output, the operating driver H2 controls to apply a power of appropriate magnitude and direction to the second coil C2 so that the second carrier 300 moves in a direction that inversely calibrate the movement according to the shaking.

If a power of an appropriate magnitude and direction is applied to the second coil C2 so that a magnetic force is generated between the second coil C2 and the second magnet M2, the second carrier 300 linearly moves in the X-axis direction relative to the first carrier 200 or the like.

According to the embodiment, when a magnetic force is generated between the second coil C2 and the second magnet M2 by adjusting the magnetic pole direction of the second magnet M2 and the arrangement direction of the second coil C2, the second carrier 300 may also be configured to move linearly in the Y-axis direction.

A series of processes such as the detection of the second hall sensor H2, the control of the second operating driver H2, the generation of magnetic force between the second coil C2 and the second magnet M2, the inverse movement of the second carrier 300, and so on are configured to be applied in time-series and cyclically, so hand shaking or the like is continuously corrected.

The method for correcting the hand shake in the Y-axis direction using the third coil C3, the third hall sensor H3, the third operating driver H3, and the like also corresponds to this method, and thus will not be described in detail here.

According to an embodiment, the second carrier 300 may also be implemented as a plurality of carriers that individually move in each of the X-axis direction and the Y-axis direction.

Figure 4:
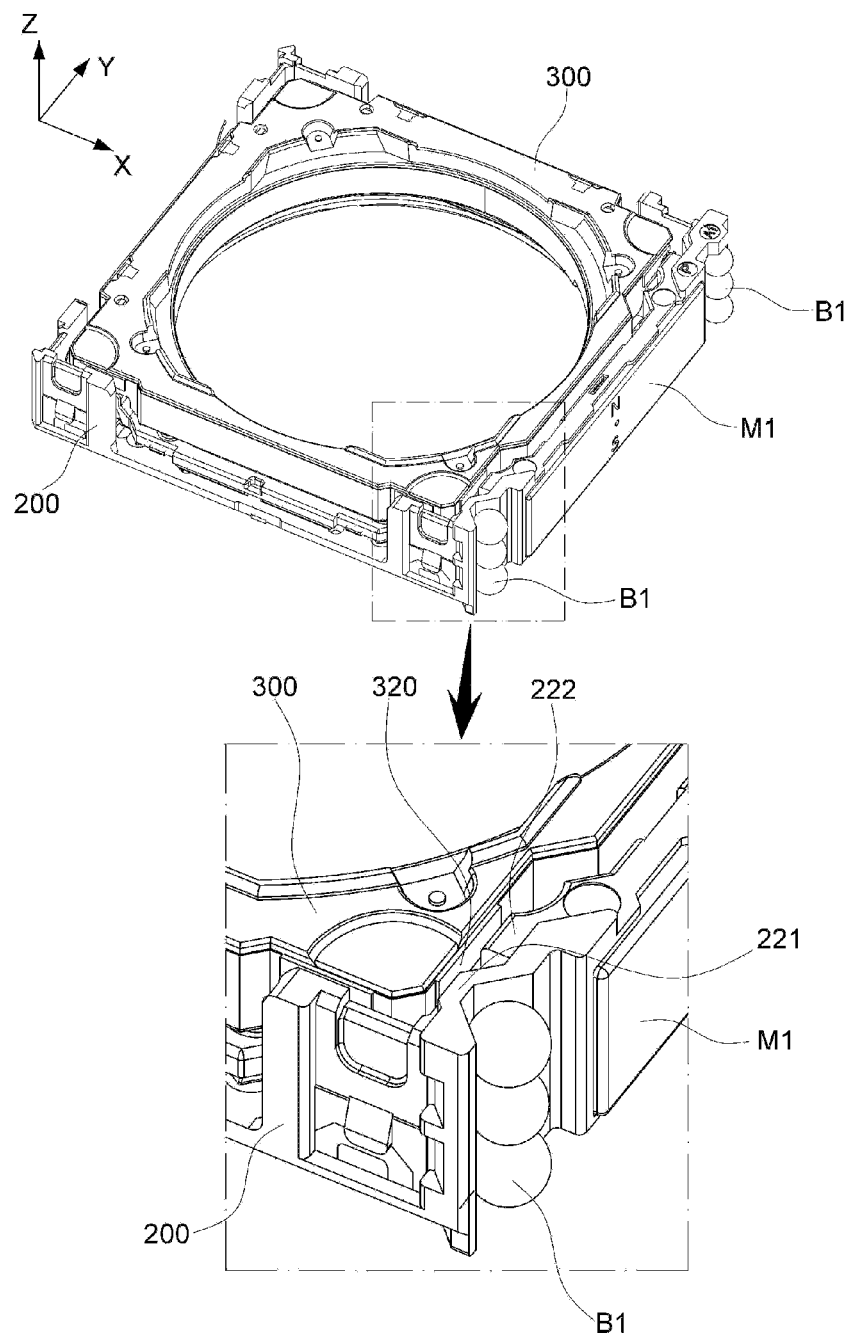
FIGS. 4 to 6 are diagrams showing the structural relationship between an inner side of the first carrier and an outer side of the second carrier.
Figure 5:
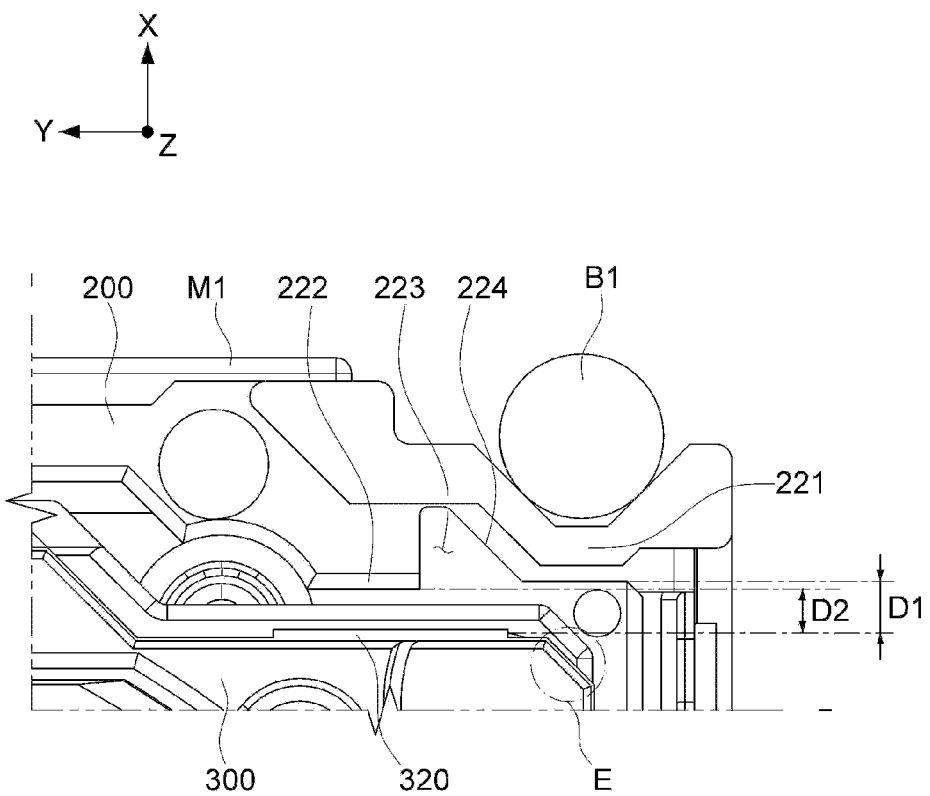
Figure 6:
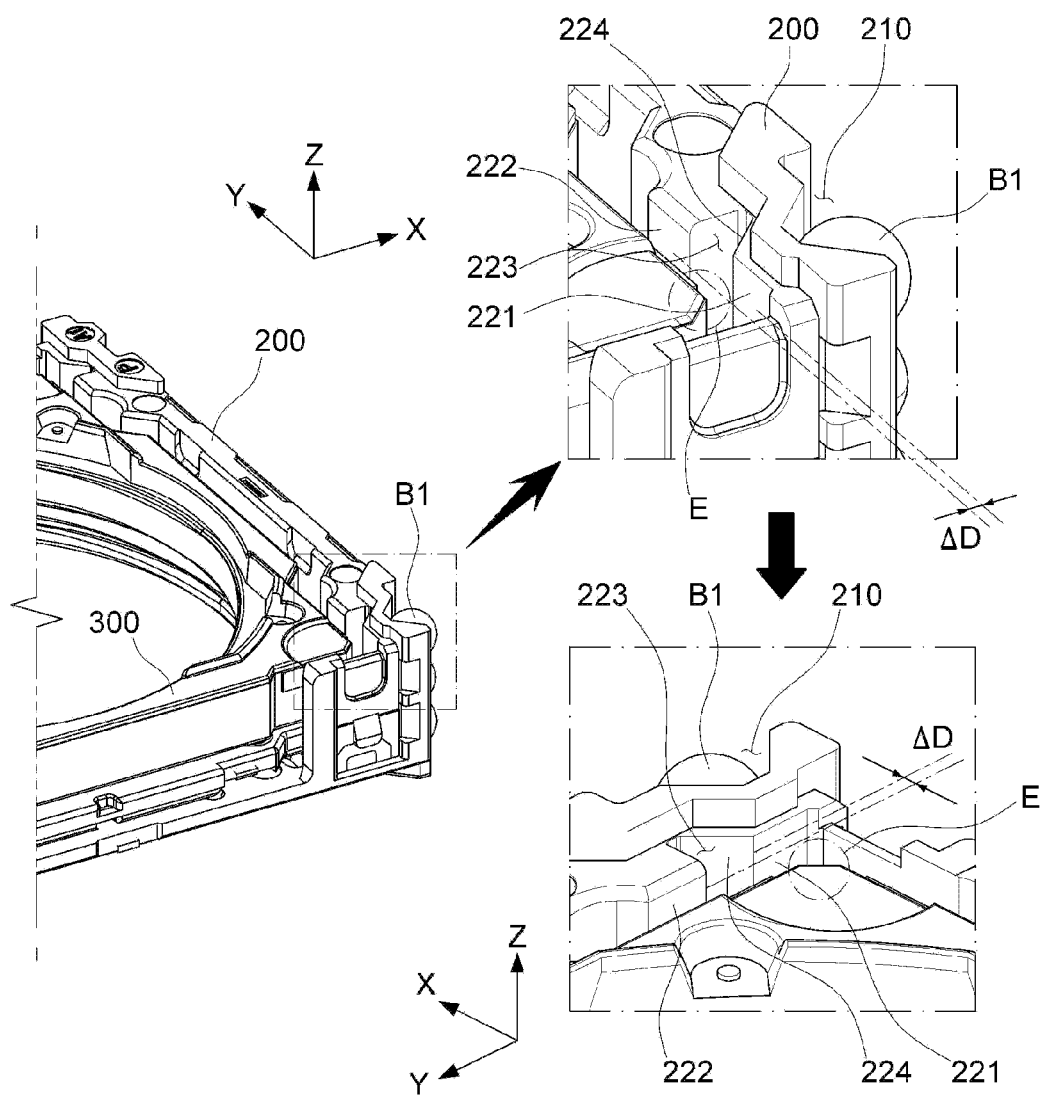

FIGS. 4 to 6 are diagrams showing the structural relationship between the inner side of the first carrier 200 and the outer side of the second carrier 300.

As described above, the second carrier 300 corresponds to a mover that is accommodated at the inner side of the first carrier 200 and moves in a direction perpendicular to the optical axis with respect to the first carrier 200, and based on the movement of the second carrier 300, the first carrier 200 relatively corresponds to a stator.

In order for the second carrier 300 to move in a combined direction of two directions (X-axis direction and Y-axis direction) perpendicular to the optical axis, a moving space may be formed between the first carrier 200 and the second carrier 300 as much as the movement distance for the OIS of the second carrier 300.

According to an embodiment, a magnetic force structure for centering a reference position of the second carrier 300 may be implemented, but this is not for suppressing an external force. Since the magnetic force structure for centering a reference position is small compared to the impact force generated at the outside, if a drop or collision occurs, the second carrier 300 strikes the inner surface of the first carrier 200.

In addition, for example, when an action of shaking a smartphone is performed to pop up a QR code for user authentication or the like, since this is a much greater shake size that cannot be compared with the hand shake that is inevitably generated while shooting an image, in this case, the second carrier 300 strikes the inner side of the first carrier 200 strongly and repeatedly.

If external shaking, dropping, collision, or impact occurs as above, the second carrier 300 gives a strong impact to the inner side of the first carrier 200, and the force generated by the impact is transmitted to the rail structure (structure for guiding the ball) provided at the outer side of the first carrier 200 as it is.

If an impact force is transmitted to the rail structure as above, since the rail structure guiding the ball is in contact with the ball made of a material with high rigidity (metal, ceramic, or the like), in a relative viewpoint, damage not occur at the ball but occurs at the surface of the rail structure or the like that is in contact (point contact) with the ball.

In the present disclosure, in order to solve this problem, even if the second carrier 300 located at the inner side strikes the outer side of the first carrier 200, the second carrier 300 is guided such that the second carrier 300 and the first carrier 200 make physical contact (collision) at a portion rather than the portion where the guiding rail 210 is provided.

Specifically, the actuator 1000 according to the present disclosure is configured such that a first interval D1 (see FIG. 5) that is an interval between a first sector 221, which is an inner side of the first carrier 200 corresponding to a portion where the guiding rail 210 is provided at the outer side, and the corresponding outer side 320 of the second carrier 300 is greater than a second interval D2 (see FIG. 5) that is an interval between a second sector 222, which is a portion of the inner side of the first carrier 200 adjacent to the first sector 221 in the inner side of the first carrier 200 where the first sector 221 is provided, and the outer side of the second carrier 300.

The corresponding outer side 320 of the second carrier 300 means an outer side of the second carrier 300 facing the inner side of the first carrier 200 where the guiding rail 210 is provided.

In this configuration, even if the second carrier 300 strikes the first carrier 200 toward the guiding rail 210, the impact is not transmitted or propagated to the portion where the guiding rail 210 is provided, so it is possible to effectively avoid the problem that the guiding rail 210 in contact with the first ball B1 is damaged due to the transmission of the external impact.

According to an embodiment, the first sector 221 and the second sector 222 are configured to have a protruding shape toward the corresponding outer side 320 of the second carrier 300, and the protruding size of the first sector 221 may be smaller than the protruding size of the second sector 222.

In a corresponding viewpoint, it is also possible that the portion of the corresponding outer side 320 of the second carrier 300 facing the second sector 222 is configured to be separated further in a concave shape or the like rather than the portion thereof facing the first sector 221.

From a practical point of view, the second carrier 300 may move only in the X-axis direction (toward the first carrier 200 equipped with the guiding rail 210 based on the drawing), or may move simultaneously in the X-axis and the Y-axis. In addition, the second carrier 300 may move in the X-axis immediately after moving in the Y-axis, and may also move in a rotational direction by combinational movement.

If the first interval D1 is configured to be greater than the second interval D2 as above (ΔD, see FIG. 6), it is possible to effectively suppress the transmission of the impact force to the portion where the guiding rail 210 is provided, even if the second carrier 300 moves in any direction.

More preferably, it is possible that an avoidance space 223 is formed between the first sector 221 and the second sector 222. If the avoidance space 223 serving as a free space between the first sector 221 and the second sector 222 is formed as above, even if the second carrier 300 rotates or the second carrier 300 moves in the +X-axis direction immediately after moving in the +Y-axis direction, it is possible to suppress the phenomenon that the second carrier 300 collides with the first sector 221 or applies an impact toward the first sector 221.

Moreover, if the avoidance space 223 is formed in this way, the force applied to the second sector 222 is cut off by the avoidance space 223 and cannot be transferred to the first sector 221, so it is possible to effectively prevent the phenomenon that the impact applied to the second sector 222 or the like causes damage to the first sector 221.

In order to further maximize the physical avoidance relationship and to implement the physical support structure of the guiding rail 210 more firmly, the avoidance space 223 is preferably configured to include a corresponding surface 224 that is formed toward the first sector 221 and has a shape corresponding to the surface of the guiding rail 210.

In addition, as illustrated in the drawings, an edge portion E (see FIG. 5 and the like) of the second carrier 300 located adjacent to the first sector 221 is more preferably configured to have an oblique or rounded shape so that the probability of physical contact (impact, collision, or the like) between the outer side of the second carrier 300 and the inner side of the first carrier 200 provided with the guiding rail 210 is further lowered.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a camera, comprising:
    a first carrier configured to move in an optical axis direction and having a guiding rail formed to extend in the optical axis direction and a first magnet, said guiding rail and first magnet being provided at an outer side of the first carrier;
    a second carrier configured to move in a direction perpendicular to the optical axis and accommodated at an inner side of the first carrier;
    a housing configured to accommodate the first carrier; and
    a ball disposed between the guiding rail and the housing, and
    wherein the first carrier comprises a first sector, a second sector and a spacer said first sector being provided at the inner side of the first carrier where the guiding rail is formed, said second sector disposed either left or right to the first magnet and being provided at the same inner side as the first sector but in a portion of the inner side not provided with the first sector, and said space being a groove formed on the inner side of the first carrier between the first and second sectors so as to physically disconnect the first sector and the second sector, wherein a first interval is greater than a second interval, said first interval being defined as the interval between the first sector and an outer side of the second carrier and said second interval being defined as the interval between the second sector and the outer side of the second carrier.

2. The actuator for a camera according to claim 1, wherein the space includes a corresponding surface provided toward the first sector and having a shape corresponding to a surface of the guiding rail.

3. The actuator for a camera according to claim 1, wherein the first and second sectors have a shape protruding toward the outer side of the second carrier, and the protruding size of the first sector is smaller than the protruding size of the second sector.

4. The actuator for a camera according to claim 1, wherein an edge portion of the second carrier adjacent to the first sector has an oblique or rounded shape.

5. A camera module, comprising the actuator for a camera according to claim 1.

\* \* \* \* \*